(12) United States Patent
Andrighetti (10) Patent No.: US 7,603,672 B1
(45) Date of Patent: Oct. 13, 2009

(54) PROGRAMMABLE REQUEST HANDLING SYSTEM AND METHOD

(75) Inventor: Robert H. Andrighetti, Somerset, WI (US)

(73) Assignee: Unisys Corporation, Blue Bell, PA (US)

( * ) Notice: Subject to any disclaimer, the term of this patent is extended or adjusted under 35 U.S.C. 154(b) by 1232 days.

(21) Appl. No.: 10/744,992

(22) Filed: Dec. 23, 2003

(51) Int. Cl.
*G06F 9/46* (2006.01)
*G06F 3/00* (2006.01)
*G06F 13/28* (2006.01)

(52) U.S. Cl. ........................ 718/103; 718/102; 718/104; 710/23; 710/40; 711/151

(58) Field of Classification Search ................. 718/102, 718/103, 104; 711/130, 145, 151; 710/23, 710/39, 40, 123, 310
See application file for complete search history.

(56) References Cited

U.S. PATENT DOCUMENTS

| | | | | |
|---|---|---|---|---|
| 5,377,332 | A * | 12/1994 | Entwistle et al. | 710/117 |
| 5,613,155 | A * | 3/1997 | Baldiga et al. | 710/5 |
| 5,617,575 | A * | 4/1997 | Sakakibara et al. | 712/34 |
| 5,634,060 | A * | 5/1997 | Jennings | 710/241 |
| 5,748,969 | A * | 5/1998 | Lee et al. | 710/244 |
| 5,931,924 | A * | 8/1999 | Arimilli et al. | 710/41 |
| 5,963,337 | A * | 10/1999 | Inui et al. | 358/296 |
| 5,970,253 | A * | 10/1999 | Purdham | 710/244 |
| 6,055,607 | A * | 4/2000 | Bauman et al. | 711/138 |
| 6,073,197 | A * | 6/2000 | Stewart | 710/104 |
| 6,076,125 | A * | 6/2000 | Anand | 710/107 |
| 6,243,378 | B1 * | 6/2001 | Olnowich | 370/388 |
| 6,260,099 | B1 * | 7/2001 | Gilbertson et al. | 710/240 |
| 6,295,553 | B1 * | 9/2001 | Gilbertson et al. | 709/207 |
| 6,411,236 | B1 * | 6/2002 | Kermani | 341/141 |
| 6,564,304 | B1 * | 5/2003 | Van Hook et al. | 711/154 |
| 6,882,649 | B1 * | 4/2005 | Gura et al. | 370/395.42 |
| 6,886,048 | B2 * | 4/2005 | Richard et al. | 710/5 |
| 6,973,548 | B1 * | 12/2005 | Vartti et al. | 711/141 |

(Continued)

FOREIGN PATENT DOCUMENTS

EP  1076293 A1 * 2/2001

(Continued)

OTHER PUBLICATIONS

Sternad et al. ("programming considerations for the 7750", IBM systems journal, Mar. 1963, pp. 57-75).*

*Primary Examiner*—Van H Nguyen
*Assistant Examiner*—Caroline Arcos
(74) *Attorney, Agent, or Firm*—Robert P. Marley; Beth L. McMahon (57) ABSTRACT

A system and method is disclosed for prioritizing requests received from multiple requesters for presentation to a shared resource. The system includes logic that implements multiple priority schemes. This logic may be programmably configured to associate each of the requesters with any of the priority schemes. The priority scheme that is associated with the requester controls how that requester submits requests to the shared resource. The requests that have been submitted by any of the requesters in this manner are then processed in a predetermined order. This order is established using an absolute priority assigned to each of the requesters. This order may further be determined by assigning one or more requesters a priority that is relative to another requester. The absolute and relative priority assignments are programmable.

15 Claims, 6 Drawing Sheets

U.S. PATENT DOCUMENTS

| | | | |
|---|---|---|---|
| 6,981,106 B1 * | 12/2005 | Bauman et al. | 711/146 |
| 7,006,501 B1 * | 2/2006 | Gura et al. | 370/395.42 |
| 7,047,322 B1 * | 5/2006 | Bauman et al. | 710/6 |
| 7,062,582 B1 * | 6/2006 | Chowdhuri | 710/116 |
| 7,093,045 B2 * | 8/2006 | Yamamoto | 710/116 |
| 7,103,887 B2 * | 9/2006 | Shavit et al. | 718/102 |
| 7,155,716 B2 * | 12/2006 | Hooman et al. | 718/102 |
| 7,213,246 B1 * | 5/2007 | van Rietschote et al. | 718/1 |
| 2002/0035675 A1 * | 3/2002 | Freerksen et al. | 711/151 |
| 2003/0065847 A1 * | 4/2003 | Goodrum et al. | 710/113 |
| 2003/0145210 A1 * | 7/2003 | Taylor | 713/182 |
| 2003/0156597 A1 * | 8/2003 | Eberle et al. | 370/447 |

FOREIGN PATENT DOCUMENTS

GB    2216368 A  * 10/1989

* cited by examiner

PROGRAMMABLE REQUEST HANDLING SYSTEM AND METHOD

FIELD OF THE INVENTION

This invention relates to a flexible priority scheme for processing requests; and, more specifically, relates to a system and method for processing requests using a priority scheme that is individually selectable for each requester.

BACKGROUND OF THE INVENTION

In electronic systems, it is common for several requesters to share a common resource. Generally, requesters must gain access to the common resource by submitting a request. A priority scheme is used to select between the one or more pending requests to determine which requester will be granted access to the resource next.

Many priority schemes are known in the art. One common priority scheme utilizes a first-in first-out (FIFO) arrangement. According to this mechanism, requesters are serviced in the order in which they are presented. This mechanism does not allow any request types to receive priority over other types. It is therefore not optimally employed in systems that have time-critical requests.

A preemptive priority scheme addresses the foregoing shortcoming by assigning each requester a different level of priority. According to this arrangement, access to a shared resource is granted to the pending request having the highest priority level. Any request with a lower priority level must wait until the higher priority request has completed. While this solution assigns a relative importance to requests, thus allowing high-priority requests to complete relatively quickly, it may result in lower priority requests from being starved out. This will be the case if a high priority request is always pending to take precedence over lower priority requests.

Another common scheme uses a rotational priority arrangement. Requests that are pending at a particular moment in time are recorded in a "snapshot". The requests in the snapshot will be processed in an order determined by a predetermined priority scheme. No additional requests will be considered for processing until all requests in the snapshot have gained access to the common resource. When all requests in the snapshot have been completed, another snapshot can be obtained and the process repeated. This mechanism ensures that low-level requests will not be starved out. All requesters have the opportunity to gain access to the shared resource according to the priority hierarchy that is adhered to within the snapshot. However, high priority requests can only gain access to the resource once per snapshot, which may not be adequate.

The above-described mechanisms are particularly unsuited for systems that benefit from precise performance tuning. For example, consider a data processing system having multiple processors coupled to a multi-tiered, hierarchical memory. The hierarchical memory includes a main memory interfacing to multiple shared caches that are each shared between respective processors. Each shared cache is further coupled to respective processors via one or more dedicated caches.

In the foregoing architecture, the instruction set of the processors includes various performance-enhancing instructions used to facilitate the transfer of instructions and data between levels in the hierarchical memory. For example, a processor may execute a flush instruction to cause certain data to be flushed from a first cache to a different cache or back to main memory. This allows the data to be more efficiently accessed by other processors within the system. Similarly, a processor may execute a pre-fetch instruction to cause specified data to be copied from the main memory to one or more caches in preparation of it being used by a processor. This reduces the access time for this data.

The types of performance enhancing instructions discussed above are generally not considered high-priority. For example, execution of an instruction to read data that is needed by the processor immediately should take precedence over a pre-fetch instruction being executed to obtain data that may be required in the future. On the other hand, the pre-fetch instruction should be allowed to complete execution so that the specified data is retrieved before the processor requires its use. Similar competing interests exist with the other types of performance enhancing instructions.

What is needed, therefore, is an improved system and method for prioritizing requests to a shared resource. This mechanism optimally allows a user to programmably fine-tune a selected priority scheme based on the requirements of each requester.

SUMMARY OF THE INVENTION

An improved system and method is provided for prioritizing the requests received from multiple requesters for presentation to a shared resource. The system includes logic that implements multiple priority schemes. This logic can be selectably configured to associate each of the requesters with one of these multiple priority schemes. For example, one or more requesters may be associated with a first priority scheme, one or more other requesters may be associated with a second priority scheme, and still another requester may be associated with a third priority scheme. The requester submits requests to the shared resource according to the mode with which it is associated. In one embodiment of the system, the priority schemes are selected from a preemptive mode, a burst mode, and a rotational mode.

The system further includes a snapshot register that records a snapshot to identify the requesters that have one or more requests pending at a predetermined moment in time. After a snapshot is captured, the requesters identified by the snapshot are allowed to submit requests in a manner controlled by the priority scheme with which they are associated. In particular, if a requester identified by the snapshot is configured in rotational mode, that requester is allowed to submit one request during the processing of the snapshot. Similarly, if a requester identified by the snapshot is configured in burst mode, the requester is allowed to submit up to a predetermined maximum number of requests during the processing of the snapshot. The maximum number of requests that may be submitted is selected individually for each requester, and in one embodiment is programmable. Finally, requesters configured in preemptive mode are allowed to submit requests even if they are not identified within the snapshot.

The foregoing can best be understood by example. Assume that a system includes requesters A, B, and C configured in preemptive, burst, and rotational modes, respectively. Requester B, which is configured in rotational mode, is associated with a maximum number of "two" requests. A snapshot is captured that identifies requesters B and C as having requests pending at the time the snapshot is captured. This snapshot is processed by receiving requests from the identified requesters B and C. In particular, during processing of the snapshot, up to two requests may be submitted by requester B, which is operating in burst mode. A single request is submitted by requester C, which is operating in rotational mode.

Finally, since requester A is configured in preemptive mode, requester A may submit requests any time during the processing of the snapshot.

In one embodiment, each requester is allowed to submit one request at a time, with successive submissions from a requester being governed by the mechanism described in the foregoing paragraph. All submitted requests that are pending at a given time are then ordered for presentation to the memory based on a default prioritization assigned to the requesters. For example, assume that requesters A, B, and C, are prioritized such that requester A is granted highest priority, requester B is granted next highest priority, and requester C is assigned the lowest priority. A request submitted by requester A will be processed before requests that have been submitted by the other requesters. If no such request is submitted, a request from requester B will be processed first, and so on. In one embodiment, the default prioritization of the requesters is programmable.

According to another aspect of the invention, the default prioritization assigned to the requesters may be modified. This is accomplished by allowing requesters to "rotate" with one another. In this embodiment, one or more requesters are assigned a priority that is relative to that assigned to another requester. For example, consider again the foregoing example wherein requester A has the highest priority and requester C is assigned lowest priority. Further, assume that requesters A and C have been assigned to rotate with one another. In this case, requester A retains the highest priority. However, because requester C has been assigned to rotate with requester A, requester C will follow requester A in the prioritization. The resulting prioritization therefore results in requester B assuming the lowest priority. This mechanism allows the default prioritization to be modified by specifying a relative, rather than an absolute, priority assignment for one or more of the requesters. This may be useful, for example, if requests from one requester such as requester C are most efficiently processed after requests from another requester, such as requester A. In this case, assigning an absolute priority to requester C is not as useful as having the ability to assign requester C a prioritization relative to requester A. Using this mechanism, requester C will always follow requester A regardless of where requester A appears in the overall prioritization. In one embodiment, the relative prioritizations of the requesters are programmable. Each requester may be associated with one or more other requesters in a manner that defines a relative prioritization for those one or more other requesters.

As stated previously, the current system and method allows each requester to submit requests based on a priority scheme individually selected for that requester. The requests that have been submitted at any moment in time are then ordered using both the default prioritization of the requesters, as well as any relative prioritizations. This prioritization determines the ordering in which the requests will be processed. This system and method has several advantages over prior art systems. First, by allowing each requester to submit requests based on a priority scheme selected specifically for that requester, the flow of requests can be controlled more precisely than in prior art systems that associate all requesters with the same priority scheme. Moreover, the system allows requesters to be prioritized using relative, as well as absolute prioritization. This provides more flexibility than prior art mechanisms. Finally, in one embodiment, the relative and absolute prioritizations assigned to the requesters, as well as the association between priority schemes and requesters, is programmable. This results in a mechanism that can be closely fine-tuned to meet the requirements of the system.

In one exemplary embodiment of the invention, the shared resource is a cache memory. A processor associated with this cache issues requests to read and/or write data from/to the cache. These requests are each stored in one of multiple queues based on the type of the request. The requests are then processed by priority logic according to a programmable priority mechanism that is adapted to optimize system performance.

In the foregoing embodiment, each of the queues may be considered a requester. According to one aspect, the queues may each store a type of request that is associated with a performance enhancing operation. For example, one type of request initiates a flush operation whereby addressed data is flushed from the cache to a different cache or back to main memory. This allows the data to be more efficiently accessed by other processors within the system. Another type of request causes addressed data to be copied from the main memory to one or more caches in preparation of it being used by a processor. This reduces the access time for this data. Still another type of request causes an addressed portion of memory to be re-initialized. The priority logic controls the rate of issuance of these types of operations so that optimal performance is achieved.

According to one embodiment, a control circuit is disclosed that includes a shared resource and multiple requesters that are each coupled to issue requests to the shared resource. The circuit includes priority logic coupled to each of the requesters to implement multiple priority modes. The priority logic is configurable to allow each requester to be associated with any selected one of the priority modes irrespective of which of the modes is associated with any of the other requesters. The priority logic prioritizes the requests from each requester for presentation to the shared resource based on the priority mode associated with each requester.

In another embodiment, a method is disclosed for selectively employing any of multiple priority schemes to prioritize requests from multiple requesters. The method includes associating each requester with any one of the multiple priority schemes without regard to which of the priority schemes is associated with any of the other requesters, and receiving requests from a requester based on the priority scheme associated with the requester. The method further includes processing the received requests in a predetermined order.

According to another aspect of the invention, a system is provided for using one or more multiple priority schemes to prioritize requests received from multiple requesters for presentation to a shared resource. The system includes prioritization means for independently associating each of the multiple requesters with any respective one of the priority schemes, and for employing the respective priority scheme to control submission of requests from the associated requester. Rotational means are provided for receiving and prioritizing the submitted requests for presentation to the shared resource. The received requests are prioritized according to a rotational prioritization that assigns a priority to each of the requesters.

A method of processing requests that are issued to a memory is further disclosed. The method includes storing each of the requests within one of multiple queues based on a type of the request, associating each queue with a priority mode governing the manner in which the queue will submit requests to the memory, and prioritizing requests submitted from each of the queues based on a prioritization of the queues.

Other scopes, aspects, and embodiments of the current invention will become apparent from the following description and the accompanying drawings.

DETAILED DESCRIPTION OF THE DRAWINGS

Figure 1:
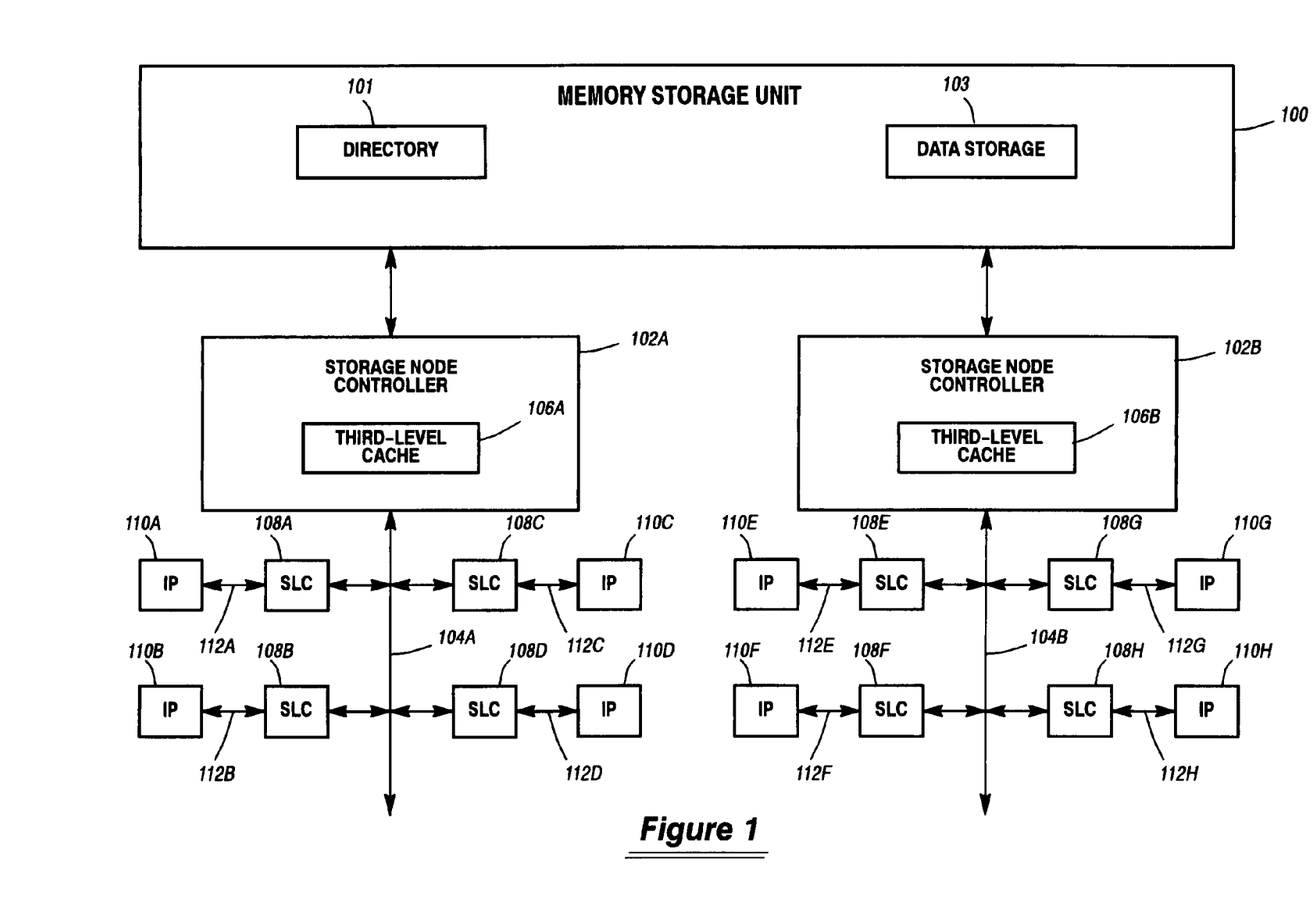
FIG. 1 is a block diagram of an exemplary data processing system of the type that may employ the current invention.

FIG. 1 is a block diagram of an exemplary data processing system as may employ the current invention. The system includes a memory storage unit (MSU) 100 that provides the main memory for the system. MSU 100 may include random access memory (RAM), read-only memory (ROM), and any other type of memory known in the art. MSU 100 may be subdivided into multiple subunits (not shown) in a manner largely beyond the scope of the current invention.

In one embodiment, MSU is a directory-based storage unit similar to the system described in commonly-assigned U.S. patent application Ser. No. 09/001,598 filed Dec. 31, 1997 entitled "Directory Based Cache Coherency System Supporting Multiple Instruction Processor and Input/Output Caches", incorporated herein by reference. In this embodiment, MSU retains information in directory 101 that indicates where the latest copy of requested data resides within the system, as is discussed further below. This is necessary since data from MSU 100 may be copied into any of the various cache memories within the system. Directory 101 tracks the latest copy of the data to ensure that every processor is operating from this copy. In the current embodiment, directory 101 includes a directory entry that tracks the location of each 128-byte block of memory within the MSU, where a 128-byte block is referred to as a "cache line". Other embodiments may utilize cache lines of different sizes.

MSU is coupled to one or more Storage Node Controllers (SNCs) shown as SNCs 102A and 102B. The system of the current invention may include more or fewer SNCs than are shown in FIG. 1. Each SNC is coupled to MSU 100 over one or more high-speed MSU interfaces that each includes data, address, and function lines. For simplicity, each SNC is shown coupled to MSU 100 over a single interface.

Each SNC includes logic to interface to the high-speed MSU interface, and further includes logic to interface to a respective one of processor buses 104A and 104B. These processor buses can utilize any type of bus protocol. Each SNC further includes a respective cache and all supporting logic. This cache may be a Third-Level Cache (TLC), a Fourth-Level Cache (4LC), or some other type of cache memory. In the embodiment shown, these caches are TLCs 106A and 106B.

As noted above, each of SNCs 102A and 102B is coupled to a respective processor bus 104A and 104B. Each processor bus further couples to multiple local cache memories. In the current embodiment, the local cache memories are shown as Second-Level Caches (SLCs) 108A-108H. In another embodiment, these local caches may be Third-Level Caches. Each SLC 108 is coupled to a respective one of the Instruction Processors (IPs) 110A-110H over a respective interface 112A-112H. For example, SLC 108A is coupled to IP 110A via interface 112A, SLC 108B is coupled to IP 110B via interface 112B, and so on. The IP may be any type of processor such as a 2200 processor commercially available from Unisys Corporation, a processor commercially available from Intel Corporation, or any other processor known in the art. Each IP may include one or more on-board caches. In the current embodiment, each IP may include a First-Level Cache (FLC). Preferably, each IP resides on a single Application Specific Integrated Circuit (ASIC) device with a respective SLC 108. Alternatively, an IP may be coupled to a respective SLC over an external interface.

When executing a stream of instructions, an IP such as IP 110A may retrieve instructions and data from MSU 100, or one of the other cache memories in the system. For example, assume IP 110A requires read/write access to a memory address. IP 110A first attempts to retrieve this address from its internal cache(s) such as a FLC. If the cache line that includes the requested address is not resident within the FLC, a request is sent to the respective SLC 108A for that cache line. If the requested cache line is likewise not resident within the SLC, the SLC forwards the request to the coupled SNC 102A via the associated processor bus 104A.

In one embodiment of the invention, each SLC implements a bus snoop protocol to monitor the processor bus for such requests. When the request is "snooped" by the SLCs 108B-108D, the SLC will return the data and desired access rights to SLC 108A on processor bus 104A if such a data copy and access rights are retained by that SLC. Similarly, if TLC 106A stores the most recent copy of the cache line, and if the TLC 106A has further been granted the desired access rights to the cache line, the cache line will be returned to the SLC 108A to be forwarded to IP 110A.

In some instances, data requested by IP 110A is not resident within any of the cache memories associated with processor bus 104A. In that case, SNC 102A forwards the request to MSU 100. MSU 100 determines the location of the most recent copy of the cache line using state bits stored within its directory 101. This copy may reside within MSU, or the data may have to be retrieved from one of the other caches such as TLC 106B or an associated SLC. In either case, after the data is retrieved, it is provided to the requester and the directory is updated.

As is apparent from the foregoing discussion, obtaining requested data might be time-consuming. In the above example, IP 110A may issue a request for data that must be retrieved from SNC 102B via MSU. If system interfaces are experiencing significant traffic, this transfer of data may be somewhat delayed. Therefore, the exemplary system of FIG. 1 includes performance-enhancing instructions that are included within the instruction sets of the IPs. These instructions are designed to transfer data to an appropriate level in the hierarchical memory structure shown in FIG. 1 in anticipation of the data being required by one of the IPs. For example, page and cache line flush instructions are included within the instruction set of each IP. These instructions may be executed by an IP to selectively flush either a page or cache line of data, respectively, from the IP's SLC to MSU 100. Generally speaking, the data may thereafter be retrieved by another IP more quickly than if the data had to be retrieved from a cache memory. The details of these instructions are largely beyond the scope of the current invention, and are described in detail in U.S. Pat. No. 6,976,126, which is incorporated herein by reference in its entirety. Another type of performance-enhancing instruction is executed by an IP to pre-fetch data from MSU 100 so that the data is available within the IP's SLC when the IP requires its use at a later time.

This eliminates the latency that would otherwise be imposed on the IP if the data were fetched from the MSU at the time of its use. This type of instruction is discussed in detail in U.S. Pat. No. 6,993,630, which is incorporated herein by reference in its entirety.

Yet another type of performance-enhancing operation involves "leaking write" instructions. According to these operations, an Instruction Processor (IP) generates requests to access data signals within its SLC. Each request includes a leaky designator. If a leaky designator is activated, the associated data signals are considered "leaky". Leaky write control logic is provided to flush this leaky data from the cache memory after a predetermined delay has occurred. Details about leaky write operations are discussed in detail in commonly assigned U.S. Pat. No. 6,934,810, which is incorporated herein by reference in its entirety.

Still another type of instruction adapted to enhance performance of a data processing system is described in commonly assigned U.S. Pat. No. 6,973,541, which is incorporated herein by reference in its entirety. This application describes a page-zero instruction that is executed by a processor to automatically initiate re-initialization of portions of the main memory.

In addition to the foregoing, other types of performance enhancing instructions may be provided within the instruction set of an IP. The details associated with the implementation of these types of instructions are not relevant to the current invention. However, it is important to note that optimizing the performance of a data processing system requires performance enhancing operations to be scheduled and completed in a manner that does not disrupt on-going processing tasks. To be effective, these operations will be executed to completion before the data and/or addresses targeted by the operations are required for use by a processor. In addition, the rate at which each type of performance enhancing operation is initiated with respect to one another must be controlled so that optimal system performance is achieved. To accomplish this, the current invention provides an improved programmable priority system and method, which is discussed in reference to the remaining drawings.

Figure 2:
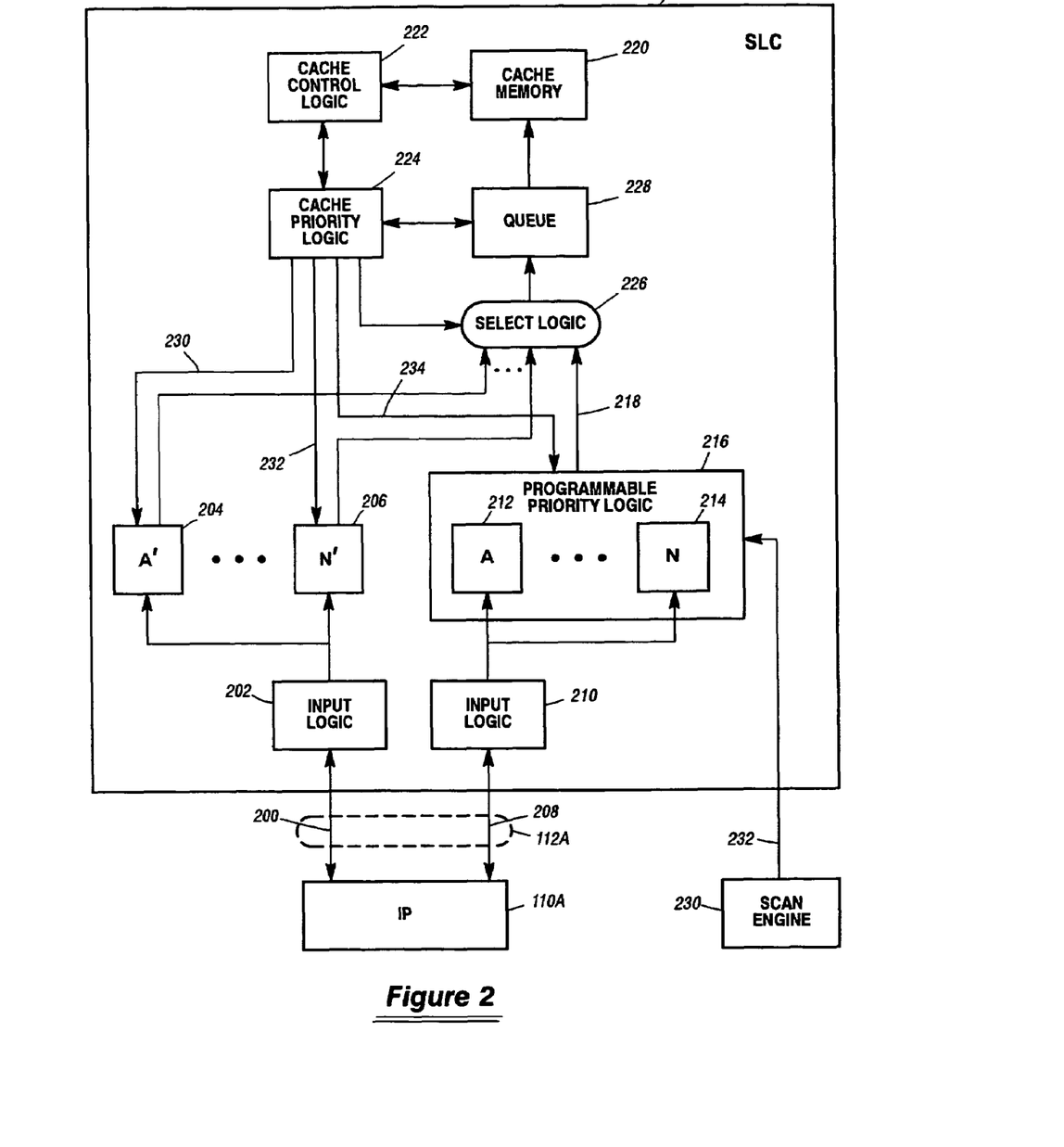
FIG. 2 is a block diagram of an Instruction Processor and Second-Level Cache of the exemplary data processing system.

FIG. 2 is a block diagram of IP 110A and SLC 108A, although it applies equally to all other IPs and SLCs in the exemplary data processing system. SLC 108A includes a cache memory 220 that stores operands and instructions that are retrieved from MSU 100 and/or TLC 106A based on requests received from IP 110A.

SLC 108A is coupled to IP 110A via interface 112A (shown dashed). Interface 112A includes a primary interface 200 that supports most read and write requests from IP 110A. Requests provided via primary interface 200 are transferred to input logic 202, and are thereafter directed to one of multiple queues A' 204 through N' 206 based on the request type. The manner in which these requests are categorized is beyond the scope of the current invention.

Interface 112A further includes a secondary interface 208 that is used to transfer lower priority requests to SLC 104A. These requests involve the types of performance enhancing operations discussed above. Such requests are provided to input logic 210, and are thereafter stored in one of queues A 212 through N 214 based on request type. Any number of queues may be provided for this purpose.

Queues A through N are included within programmable priority logic 216, which provides an improved priority control system for optimizing system performance. Programmable priority logic 216 prioritizes all of the requests within queues A through N in preparation for their storage in queue 228.

Cache priority logic provides control signals to each of queues A' 204 through N' 206 and programmable priority logic 216 to control the transfer of requests into queue 228. Each group of controls signals, shown on lines 230, 232, and 234, respectively, includes a busy signal. When a busy signal is deactivated, the recipient provides another request to select logic 226. Select logic selects the request based on control signals generated by cache priority logic 224. The request is then stored within queue 228. After requests are stored within queue 228, they are provided to cache memory 220 in a First-In, First-Out (FIFO) manner for processing.

The system further includes a scan engine 230 and scan interface 232. As is known in the art, this interface allows for the initialization of various programmable devices within the system, such as those included within programmable priority logic 216. This will be discussed further below.

Figure 3:
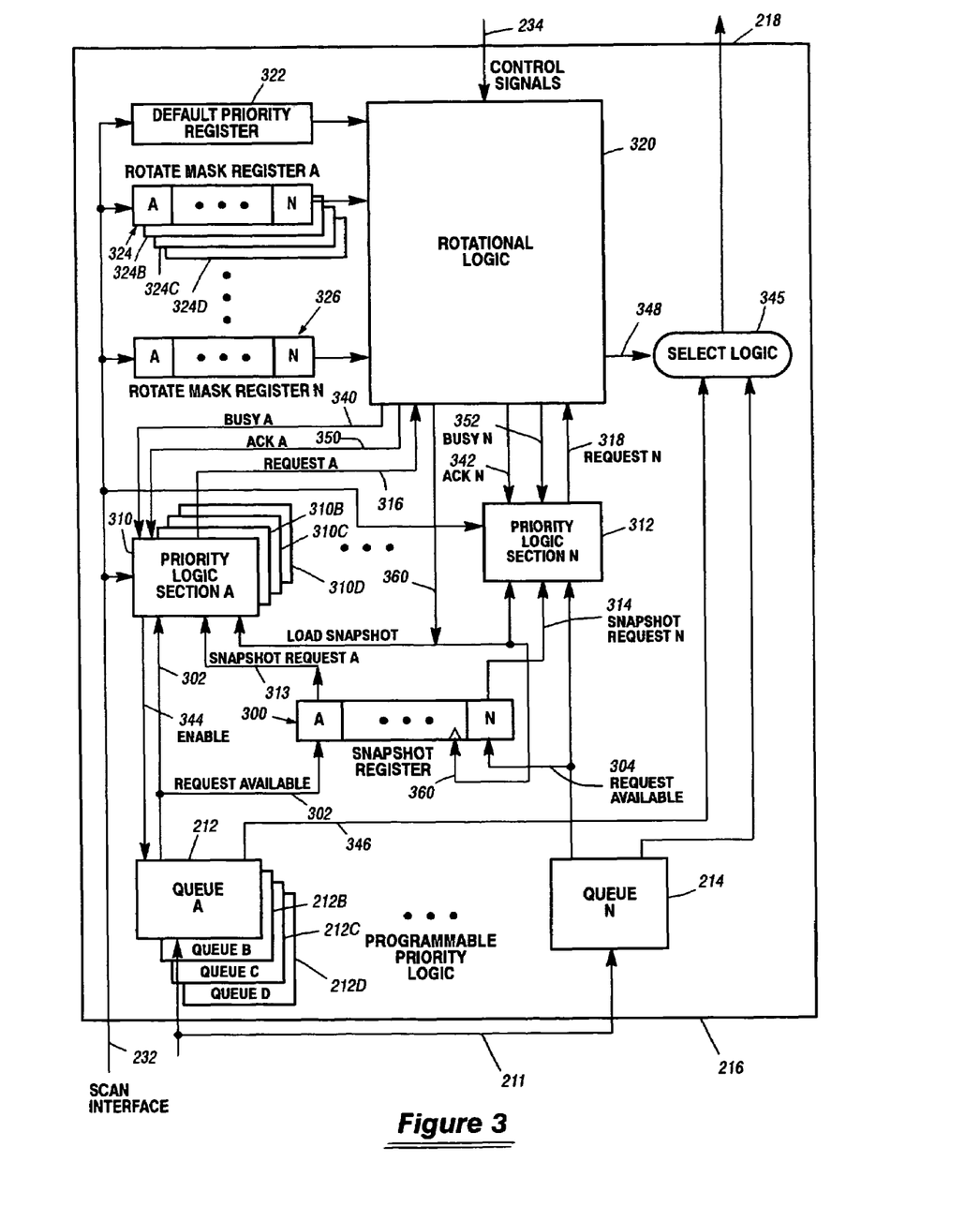
FIG. 3 is a block diagram of special request priority control logic according to one embodiment of the current invention.

FIG. 3 is a block diagram of programmable priority logic 216 according to one embodiment of the current invention. FIG. 3 explicitly illustrates queues A, B, C, D and N, as will be discussed below. It will be understood any number of queues may be provided within the scope of the current invention. Each of the queues A, B, C, D, and N will be understood to be associated with logic that is similar to that shown explicitly for queues A 212 and N 214. Logic is not replicated in its entirety for queues B, C, and D for simplicity.

As discussed above, requests provided on lines 211 are loaded into one of multiple queues shown as queues A 212, B 212B, C 212C, D 212D, through N 214 by input logic 210 based on request type. For example, cache line flush requests may be stored within queue A, page flush requests may be stored in a different queue, and so on.

Each of queues A 212 through N 214 provides a request available signal to a snapshot register 300 on lines 302 through 304, respectively. If a queue stores at least one request, its request available signal is activated. The request available signals are captured within snapshot register 300 at periodic intervals to create a request "snapshot". This snapshot is loaded into snapshot register 300 by a load snapshot signal on line 360. In a simple scenario wherein none of the queues are operating in preemptive mode, all requests associated with a given snapshot are processed before another snapshot is taken. This will be discussed in more detail below.

The signals stored within snapshot register 300 are provided to respective priority logic sections shown as priority logic sections A 310 through N 312. For instance, a snapshot request A signal is provided on line 313 to priority logic section A 310, which controls the processing of requests stored in queue A 212. Similarly, a snapshot request N signal for queue N is provided on line 314 to priority logic section N 312, which controls the processing of requests stored in queue N 214, and so on. Priority logic sections B 310B, C 310C, and D 310D, which correspond respectively to queues B, C, and D, are shown in shadow only for simplicity. It will be understood that interconnections similar to those shown explicitly for priority logic sections A and N exist for these priority logic sections B through D. The priority logic sections are discussed in detail below.

When a priority logic section receives either an activated request available signal or a snapshot request signal from snapshot register 300, the priority logic section will determine whether a request should be made available to rotational logic 320. If so, the priority logic section asserts a respective request signal to rotational logic 320. For instance, priority logic section A 310 raises request A on line 316, priority logic section N 312 raises request N on line 318, and so on.

Rotational logic 320 determines the relative priority of the queues that are associated with activated request signals. This determination is made using signals stored within programmable registers, including default priority register 322, and rotate mask registers A 324, B 324B, C 324C, D 324D, through N 326. The default priority register 322 stores programmable signals that order queues A through N from highest to lowest priority, and thereby determine the default order in which requests will be processed. Rotate mask registers A 324 through N 326 store signals that are used to modify the default priority ordering specified by default priority register 322.

Each of rotate mask registers A through N is associated with a respective one of queues A 212 through N 214. Rotate masks 324B, 324C, and 324D, which are associated with queues B, C, and D, respectively, are shown in shadow only, and it will be understood similar interconnections exist for these registers as are discussed in reference to registers A and N. These registers are programmable, and store data indicating the queues that will be "rotating" with the associated queue. This can best be understood by the following example.

As discussed above, queues A through N may include any number of queues. Assume for this example programmable priority logic 216 includes four queues A 212, B 212B, C 212C, and D 212D. Each queue is associated with a respective one of rotate mask registers A through D. Rotate mask register A will indicate the queues that are rotating with queue A, rotate mask register B will designate the queues rotating with queue B, and so on. This could be indicated by implementing a master-bitted scheme, or any other suitable mechanism.

In the current scenario, assume that queue A is rotating with queues B and C. Rotate mask register A will therefore be set to a state that activates designators for queues A, B, and C. If a master-bitted implementation is employed, bit fields for queues "A", "B", and "C" could be activated, for example. This setting indicates that after queue A provides one or more requests to queue 228, queues B and C will also each provide one or more requests to queue 228. The relative priority of queues B and C in this rotation will be determined by the data stored within default priority register 322. For instance, if default priority register 322 indicates C has a higher priority than B, the overall rotation priority will be selected as A, then C, followed by B.

Each of rotate mask registers may be set up individually. In one embodiment, the rotate mask registers are initialized in a complementary manner such that if rotate mask register A 324 indicates queue A 212 is rotating with queues B and C, then each of the rotate mask registers for queues B and C will likewise indicate that queues B and C are rotating with queue A 212. However, this is not necessarily a requirement, as will be discussed further below.

The operation of the default and rotate mask registers is best explained by continuing the foregoing example involving queues A, B, C, and D. Assume default priority register 322 stores data indicating queue A has the highest priority, queue B has the next highest priority, and so on, with queue D having lowest priority. In addition, rotate mask registers A and D is each set to indicate that queues A and D rotate with one another. As discussed above, if a master-bitted scheme were employed, this could be accomplished by activating bits associated with queues A and D in each of rotate mask registers A 324 and D 324D. Similarly, rotate mask registers B and C are set to indicate that queues B and C rotate together.

The register settings described above are used by rotational logic 320 to determine queue priority as follows. Default priority register 322 indicates that the queues have the following priority, from highest to lowest:

A B C, and D.

Starting with the highest priority queue A, the rotate mask register A 324 is read to determine if the default prioritization should be altered. Rotate mask register A 324 indicates that queues A and D rotate with one another. Therefore, the queue combination A/D is substituted for A in the rotation as follows:

A/D B C, and D.

Since D now appears twice in this prioritization, the last occurrence of D is eliminated, as follows:

A/D B and C.

Next, queue B is considered, since that is next in the priority ordering. As discussed above, the rotate mask register for queue B indicates queue B rotates with queue C. Therefore, B/C is substituted for B in the default ordering such that the prioritization is as follows:

A/D, B/C, B and C.

The latter occurrences of B and C are removed as duplicates, and the final queue prioritization is as follows:

A, D, B, and C.

Of course, this prioritization could be obtained by re-programming default priority register 322. However, the current scheme has the advantage that it allows the overall rotation to be fine-tuned without having to reconfigure the default prioritization. This is particularly beneficial in a configuration including a larger number of queues A through N. For example, assume that the most efficient way to process requests of types A and D is to allow requests of type D to follow requests of type A whenever possible and irrespective of the priority level granted to requests of type A in default priority register 322. Therefore, rather than modifying the overall priority scheme defined for all of the queues by default priority register 322, it is more efficient to update rotate mask registers A and D to reflect that A and D will rotate together. Then, so long as requests of type A are granted a higher priority as compared to those of type D in the default priority register 322, requests of type D will follow requests of type A in the rotation, assuming none of the requesters are operating in preemptive mode to be discussed below.

As can be appreciated from the foregoing example, the rotate mask registers provide a mechanism to allow one or more of the requesters to be assigned a priority that is relative to that granted to another requester, and irrespective of the overall absolute prioritization provided by the default priority register 322. This allows the priority ordering to be fine-tuned in a manner that is easier to conceptualize, and is less error-prone, than attempting to change the entire default prioritization stored within default priority register 322. Moreover, even if default priority register is re-programmed in a manner that does not take into account the fact that requests of type D will follow those of type A, this relationship is never-the-less enforced by the appropriate use of rotate mask registers A 324 and D 324D.

If desired, the default prioritization established by the default priority register 322 may be left unmodified. In this case, all of the fields of the rotate mask registers A through N are set to an inactive state, and are not utilized by rotational logic 320. Alternatively, some of the rotate mask registers may be employed, whereas other may remain with all field inactivated.

The way in which the above-described prioritization mechanism may be used to process a snapshot of requests is best understood by continuing the foregoing example. Assume a snapshot of requests is loaded into snapshot register 300. This snapshot indicates that each of queues A, B, C, and D stores at least one pending request. Each of the snapshot request signals from snapshot register 300 is provided to a respective priority logic section A 310 through D 310D for processing in the manner discussed above. This results in each of the priority logic sections A through D asserting a respective request signal to rotational logic 320. For example, priority logic section A 310 asserts the request A signal on line 316, and etc.

Eventually, cache priority logic 224 will deactivate a busy signal that is provided to rotational logic 320 as part of control signals 234. This indicates that queue 228 may receive another request from programmable priority logic 216. In response, rotational logic 320 will deactivate the appropriate busy signal to whichever priority logic section A through D is associated with the highest priority queue. In the current example, queue A is the highest priority queue, as is determined using default priority register 322 and rotate mask registers A 324 through D in the manner described above. Therefore, rotational logic 320 deactivates busy A 340. This causes priority logic section A 310 to activate signal enable A 344, allowing the oldest pending request within queue A to be driven to select logic 345 on lines 346. This request is selected by control signals 348 generated by rotational logic 320. The request is driven to queue 228 on interface 218.

Each group of control signals 230, 232, and 234 of FIG. 2 includes a respective acknowledge signal. An acknowledge signal is generated by cache priority logic 224 to inform the recipient that a request provided by the recipient has been successfully stored within queue 228. In the current example, cache priority logic asserts the acknowledge signal that is included within control signals 234 to indicate that the request from queue A 212 has been stored within queue. In response, rotational logic 320 asserts signal ack A on line 350. This signals priority logic section A 310 that it may provide another request.

Priority logic section A may be programmed to provide multiple requests in succession, as will be discussed below. In this case, and assuming additional requests are available within queue A 212 for processing as indicated by the request available signal on line 302, priority logic section A 310 holds its request A signal on line 316 active. As a result, when cache priority logic 224 again deactivates the busy signal included within control signals 234, rotational logic 320 will respond by deactivating the busy A signal on line 340. Priority logic section A 310 thereafter enables another request to be transferred from queue A 212.

Assume next that a second request has been successfully transferred from queue A to queue 228, and the ack A signal on line 350 is asserted by rotational logic 320. This time, however, assume that queue A 212 is either empty or the maximum number of requests that are to be provided by queue A has already been transferred, as determined by programmable logic within priority logic section A. In either case, priority logic section A 310 deactivates the request A signal on line 316 after the ack A signal on line 350 is asserted.

In response to deactivation of the request A signal, rotational logic 320 will begin processing requests from the next highest queue, which in the current example is queue D. As such, rotational logic 320 will deactivate a busy signal to priority logic 310D for queue D 212D so that requests from this queue can be received. The priority logic section for queue D will gate the oldest pending request from queue D to select logic 345 in a manner similar to that described above in reference to queue A. The request is selected by control signals 348 and gated to queue 228.

In a simple scenario in which none of priority logic sections A through N are programmed in a preemptive mode to be discussed below, rotational logic 320 will continue processing each of the request signals A 316 through D based on the prioritization determined by default priority register 322 and rotate mask registers A 324 through D. This involves processing requests from queue A first, followed by requests from queue D, then requests from queue B, and finally requests from queue C in accordance with the current example. It should be noted that in this simple scenario, if any of the queues were not represented within the snapshot register 300, the respective request signal from the queue's priority logic section would not be asserted to rotational logic 320. Therefore, that queue is skipped in the rotation. For example, assume that snapshot request A 313 is not activated because request available 302 from queue A 212 was not activated at the time the snapshot was captured in snapshot register 300. Rotational logic 320 win therefore begin processing requests from queue D 212D first, followed by requests from queues B 212B and C 212C.

Rotational logic 320 continues processing requests until every queue represented in the current snapshot has been processed in accordance with the programmed settings of the various priority logic sections. At this time, all request signals A 316 through N 318 will be deactivated. Rotational logic 320 then provides a load snapshot signal on line 360 to snapshot register 300, and to each of the priority logic sections A 310 through N 312. This signal causes another snapshot to be loaded, and re-enables logic within the priority logic sections, as will be discussed further below. This allows the process to be repeated.

The foregoing discussion describes a simple scenario wherein none of priority logic sections A 310 through N 312 is operating in a preemptive mode. In this case, once a request signal such as request A on line 316 is deactivated, it is not re-activated again until the next snapshot is captured. In a more complex scenario, a priority logic section may be programmed in a pre-emptive mode. In this case, the logic section will assert its request signal to rotational logic 320 any time there is a pending request within its respective queue, and irrespective of the contents of snapshot register 300. For example, assume that a snapshot is taken at a time when request available 302 from queue A is not activated because queue A is empty. Sometime later while that snapshot is being processed, a request is stored within queue A 212, causing request available 302 to be asserted. Assume that priority logic section A 310 is programmed in a preemptive mode. Priority logic section A therefore responds to the request available signal on line 302 by asserting the request A signal on line 316, even though queue A 212 is not represented in the current snapshot stored within snapshot register 300.

When rotational logic 320 is ready to receive another request, queue A will be recognized as the highest priority queue because request A on line 316 is asserted. Rotational logic 320 will process requests stored within queue A 212 until queue A is empty. Rotational logic will then continue processing requests from other queues according to the priority ordering discussed above. Any one or more of the priority logic sections may be configured using the preemptive mode such that a request signal may be asserted to rotational logic 320 at any time irrespective of the snapshot stored within snapshot register 300. This will be discussed further below.

It may be appreciated that the foregoing example discusses a simple case involving the prioritization of queues A through D. Any number of queues may be prioritized in a similar manner using the current invention. Moreover, the prioritization may be programmably selected. In particular, scan interface 232 may be used to program default priority register 322, the rotate mask register A through N, and the priority logic sections A 310 through N 312. The configuring of priority logic sections A through N is discussed in reference to FIG. 4.

Figure 4:
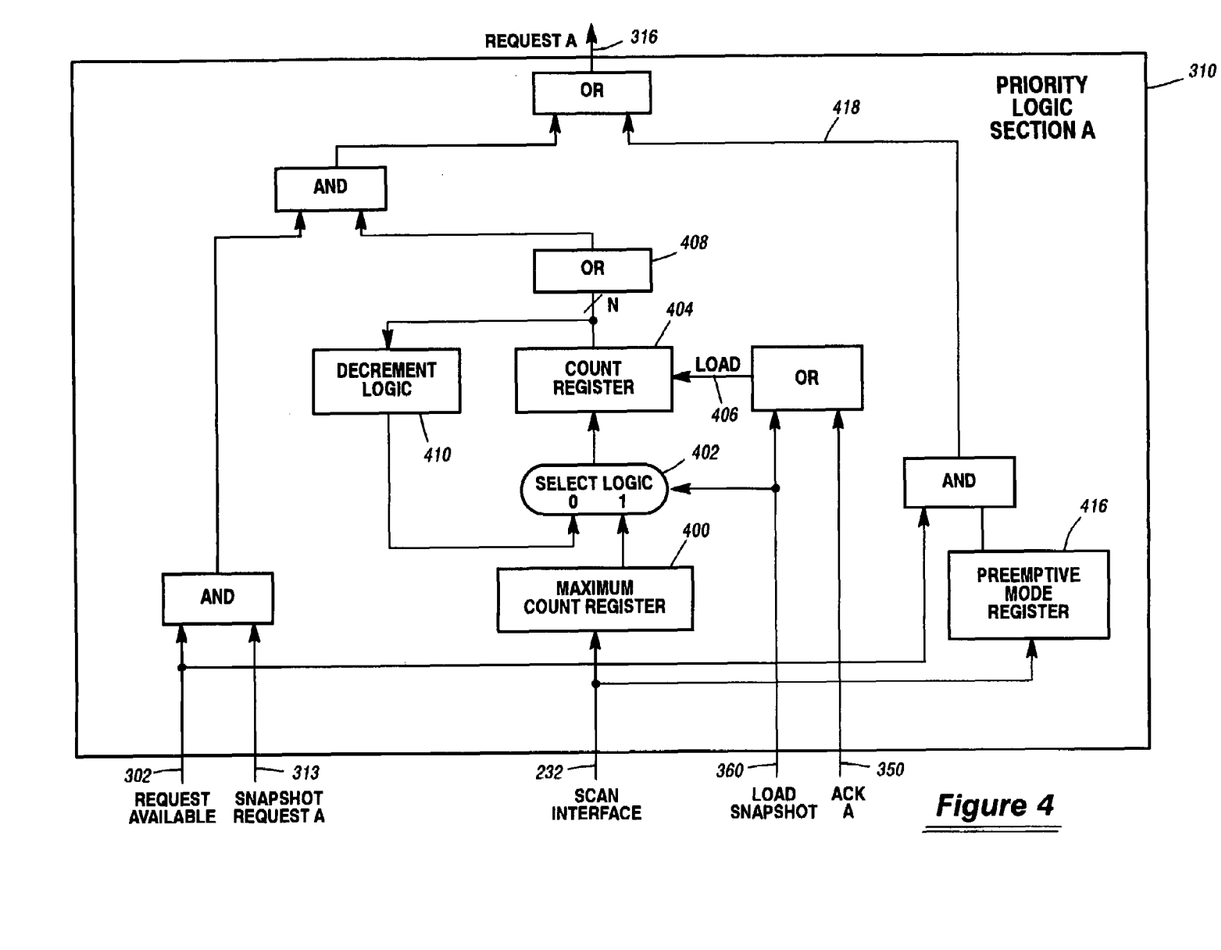
FIG. 4 is a block diagram of a priority logic section of the current invention.

FIG. 4 is a block diagram of logic included within a priority logic section of FIG. 3. Although priority logic section A 310 is shown and described, it will be understood this discussion also applies to all priority logic sections A 310 through N 312.

Request logic section A may be programmed to operate in a burst mode, a rotational mode, or a preemptive mode. In burst mode, a count value that is greater than one is stored within maximum count register 400. This count controls the number of successive requests that will be provided from queue A 212 to queue 228 before the request A signal on line 316 is de-activated.

The maximum count register may be initialized using scan interface 232. In general, the largest count value that may be stored within maximum count register 400 is determined by the depth of queue A 212. This count value is provided to select logic 402. When the load snapshot signal on line 360 is asserted by rotational logic 320, select logic 402 selects the maximum count value, which is loaded into count register 404 by a load signal on line 406. As long as the count register stores a non-zero count value, as determined by OR gate 408, and assuming the snapshot request A signal on line 313 is activated and queue A is not empty as indicated by the activated request available signal on line 302, the request A signal on line 316 will be activated.

Decrement logic 410 is provided to decrement the contents of count register 404 by a predetermined amount, which in one embodiment is "one". The decremented value generated by decrement logic 410 is selected by select logic 402 so long as the load snapshot signal on line 360 is deactivated. This decremented count value is loaded into count register 404 when rotational logic 320 provides the ack A signal on line 350 to indicate the most recently provided request has been successfully loaded into queue 228. When the count value is finally decremented to zero, the request A signal on line 316 will be de-activated, assuming the logic is not also programmed to operate in preemptive mode.

Request logic section A may further be programmed to operate in a rotational mode. In this mode, maximum count register 400 is set to "one" such that only a single request is provided to queue 228 before count register 404 is set to zero, and the request A signal is deactivated. If all priority logic sections are programmed to rotational mode, the system will operate according to a purely rotational priority scheme. The order of rotation will be determined by default priority register 322 and the rotate mask registers.

Request logic section A 310 further includes a preemptive mode register 416. Request logic section A is programmed in a preemptive mode by setting preemptive mode register 416 to a predetermined state, which in the current example is a logical high active state. When in preemptive mode, the signal on line 418 is activated so long as queue A is not empty, as indicated by an activated request available signal on line 302. This results in activation of the request A signal on line 316 irrespective of the state of count register 404.

In general, when request logic section A 310 is programmed in preemptive mode, maximum count register 400 is programmed to zero. However, since preemptive mode will override the count value, this need not be the case. A non-zero value in maximum count register 400 will have no affect on circuit operation when in preemptive mode.

The current invention provides a mechanism that allows the priority scheme associated with each queue to be individually tailored. For example, a queue may be programmed to submit requests using a rotational mode by setting its maximum count register to "one". If all priority logic sections are programmed in this manner, the system will employ a rotational priority mechanism, with rotation occurring as determined by default priority request 322 and the rotate mask registers A 324 through N 326. In the alternative, the requester can operate in a burst mode by setting the maximum count register to a value greater than "one". This allows the requester to submit more than one request during the processing of a snapshot. Finally, the requester can be programmed to preemptive mode wherein the requester can submit any number of requests during the processing of a snapshot regardless of whether the requester is represented by the current snapshot.

Figure 5:
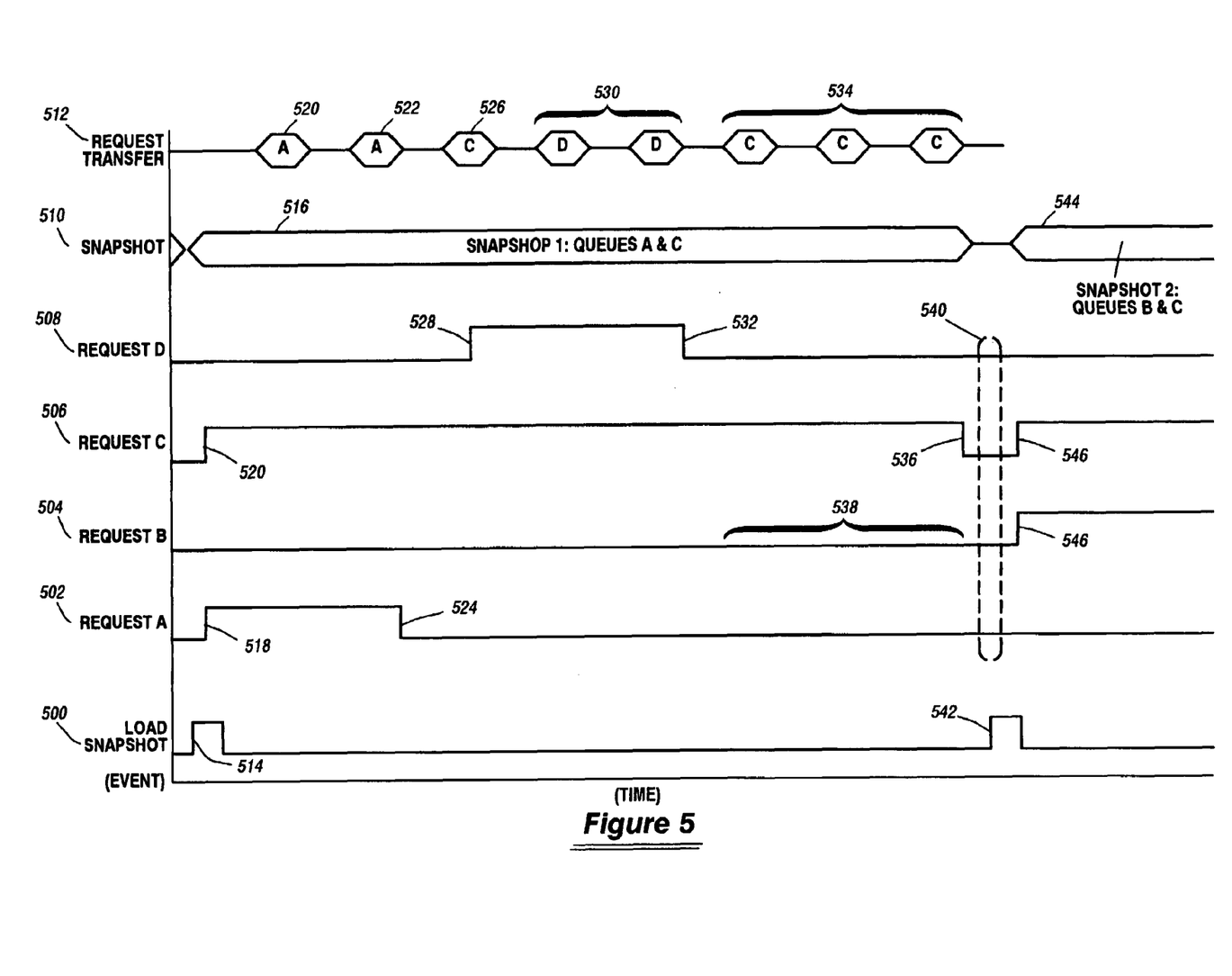
FIG. 5 is a timing diagram illustrating an exemplary use of the current priority system.

FIG. 5 is a timing diagram illustrating an exemplary use of the current invention. This timing diagram depicts the above-described embodiment including queues A 212 through D 212D. Waveform 500 represents the load snapshot signal on line 360 generated by rotational logic 320. Waveform 502 illustrates request A signal on line 316 of FIG. 3. Similar signals for requests B through D are represented by waveforms 504, 506, and 508, respectively. The loading of a new snapshot into snapshot register 300 is illustrated by waveform 510. The transfer of requests from queues A through D on line 218 is represented by waveform 512. It will be appreciated that although FIG. 5 depicts requests are being transferred at a uniform rate to queue 228 on line 218, this is merely for simplicity. In practice, requests will generally be provided to queue 228 at an irregular rate. Furthermore, these requests may be separated by relatively long periods of time depending on the rate at which requests are being stored within queues 204 through 206, and based on the priority scheme utilized by cache priority logic 224.

Continuing with the current example, load snapshot signal is asserted on line 360 to load another snapshot into snapshot register 300, as shown by rising edge 514 of waveform 500. This new snapshot 516 is illustrated in waveform 510. At the time this snapshot is captured, it will be assumed that priority logic sections A through C are programmed in burst mode, and priority logic section D is programmed in preemptive mode. Also at this time, at least one request is stored within queues A and C, but queues B and D are empty.

When the snapshot is stored within snapshot priority register 300, snapshot request signals for A and C are activated because requests are resident within queues A and C, respectively. As a result, the request A signal on line 316 is activated to rotational logic 320, as shown by edge 518 of waveform 502. A similar request C signal is generated by priority logic section C 310C, as shown by edge 520 of waveform 504.

Assuming the default priority register 322 and rotate mask registers A through D are initialized in the manner discussed above in reference to FIG. 3, rotational logic 320 will determine that requests from queue A receive the highest priority, followed by those of queue D, then queue B, and finally queue C. Therefore, when cache priority logic 224 determines that another request from programmable priority logic 216 may be received, rotational logic 320 deactivates busy A 340 to allow a request from queue A 212 to be driven onto lines 218. This is shown by transfer 520 of waveform 512.

It will be assumed that maximum count register 400 for priority logic section A 310 is set to "four". Therefore, up to four requests may be transferred to queue 228 during the current snapshot. Sometime after the first request is transferred, another request transfer 522 occurs, as shown by waveform 512.

After the second request is transferred from queue A, it will be assumed that queue A is empty. When rotational logic 320 deactivates signal ack A on line 350 to indicate that the second request from queue A has been stored within queue 228, count register 400 will be decremented to "two", indicating that two additional requests may be transferred from queue A. However, because queue A is now empty, the request A signal on line 316 is deactivated, as shown by edge 224 of waveform 502. If sometime later during the processing of this snapshot, another request is stored within queue A, the request A signal will be reasserted. Up to two additional requests may be transferred to queue 228 during processing of the current snapshot, assuming these requests become available before snapshot processing is complete.

According to the priority scheme discussed above, rotational logic 320 will next process any requests from queue D. However, queue D is empty in the current scenario, and is therefore not represented in the current snapshot. A similar situation exists with queue B. Thus, rotational logic begins processing requests from queue C, which is last in the rotational priority. A first request is obtained from queue C, as shown by transfer 526 of waveform 512.

While the first request transfer from queue C is occurring, it will be assumed a request is loaded into queue D. This request will result in activation of a request available signal from queue D, which is provided to priority logic section D 310D. This request is not represented in the current snapshot. However, recall that priority logic section D 310D is programmed in preemptive mode. Activation of a request available signal from queue D 212D will therefore result in activation of a request signal to rotational logic 320 even though queue D is not represented by the snapshot, as shown by edge 528 of waveform 508.

After rotational logic 320 asserts the acknowledge signal for transfer 526 from queue C, rotational logic 320 will not continue processing requests from queue C. Instead, rotational logic will obtain the request from queue D, since queue D is higher in the priority scheme than queue C. Rotational logic 320 will continue processing requests from queue D until the queue is empty and the request D signal to rotational logic is deactivated. Assuming two requests are now stored in queue D, two transfers 530 from queue D will occur before subsequent deactivation of request D, as illustrated by edge 532 of waveform 508.

When the request D signal is deactivated, rotational logic 320 will resume processing requests from queue C. It will be assumed that queue C stores sixteen requests. However, maximum count register 400 within priority logic section C 310C is set to "four". Therefore, three additional requests 534 will be transferred from queue C before decrementation of the count register and subsequent deactivation of request C, as illustrated by edge 536 of waveform 506. Request C is forced inactive even though additional requests remain stored within queue C.

During transfers 534, it will be assumed a request is stored within queue B, which had been empty. This will activate a request available signal to priority logic section B 310B. However, recall that priority logic section B is programmed in burst mode. Thus, activation of the request available signal does not result in activation of a request B signal to rotational logic 320. This is shown by segment 538 of waveform 504, which remains in an inactive state. This new request in queue B will not be processed until after another snapshot is captured in snapshot register 300.

After all request signals to rotational logic 320 have been deactivated, as shown by portions 540 of waveforms 502 through 508, rotational logic generates another load snapshot signal on line 360 to snapshot register 300. This is shown by edge 542 of waveform 500. Another snapshot 544 is loaded into snapshot register. This snapshot reflects that queues B and C now each stores at least one request. When this snapshot is loaded, request B and C signals to rotational priority logic 320 are asserted, as shown by edges 546 of waveform 504 and 506, and the process may be repeated.

In one embodiment, the current invention is used to control the flow of various types of processor requests to cache memory 220. For example, an IP such as IP 110A executes various instructions to cause data to be read from, and written to, its SLC during normal processing activities. These types of operations will result in read and write requests being stored within respective ones of queues A' 204 through N' 206. These types of requests will be assigned a high priority by cache priority logic 224.

Other types of lower priority operations are also initiated by an IP. For instance, various performance enhancing instructions may be executed by an IP to initiate operations to optimize system throughput. These operations result in the issuance of requests to an SLC that are to be processed by the SLC as lower-priority background tasks. As discussed above, these requests include flush requests that cause data to be transferred from cache memory 220 to a different cache or back to MSU 100. For example, one type of flush request causes a cache line of 124 bytes to be transferred to MSU 100. Another type of flush request results in the transfer of a 4096-byte page to MSU 100. Still another type of operation may be initiated by an IP to cause addressed data that is not used for a period of time to be periodically "leaked" from an SLC 108 and stored back to MSU 100. Any of these types of instructions allow updated data to be stored within MSU 100 so that it is more readily available to another IP in the system.

Still other types of performance-enhancing instructions may be initiated by an IP. For example, an IP may execute a pre-fetch instruction that results in the issuance of a pre-fetch request to the SLC. This causes addressed data to be pre-fetched from MSU 100 and stored in the SLC so that the data is available in anticipation of its use, reducing latency that would be associated with retrieving that data at the time it is needed. Other performance enhancing instructions include those executed by an IP to initialize addressed portions of the MSU.

The details of the above-mentioned operations are not within the scope of the current invention. What is important to note is that execution of performance-enhancing instructions should not be allowed to affect the performance of on-going higher priority instruction execution. However, if possible, it is desirable to allow these types of instructions to complete execution before any data targeted by the instructions is required by the processor. To achieve this balance, the initiation of performance-enhancing operations must be carefully fine-tuned. These objectives can be accomplished by assigning queues A' 204 through N' 206 a higher priority than the priority assigned to programmable priority logic 216. Moreover, the devices included within programmable priority logic 216 may be programmed to assign a relative priority to the various performance-enhancing operations. This prioritization may be based on factors such as the issuance rate, and average latency associated with completion of, a given type of operation. Program settings may also be selected based on the optimal ordering of events. For example, it may be desirable to perform all pending page flush operations before allowing any pre-fetching to occur. This may be controlled using the default priority register 322 and various rotate mask registers, or through the use of priority mode assignments.

Figure 6:
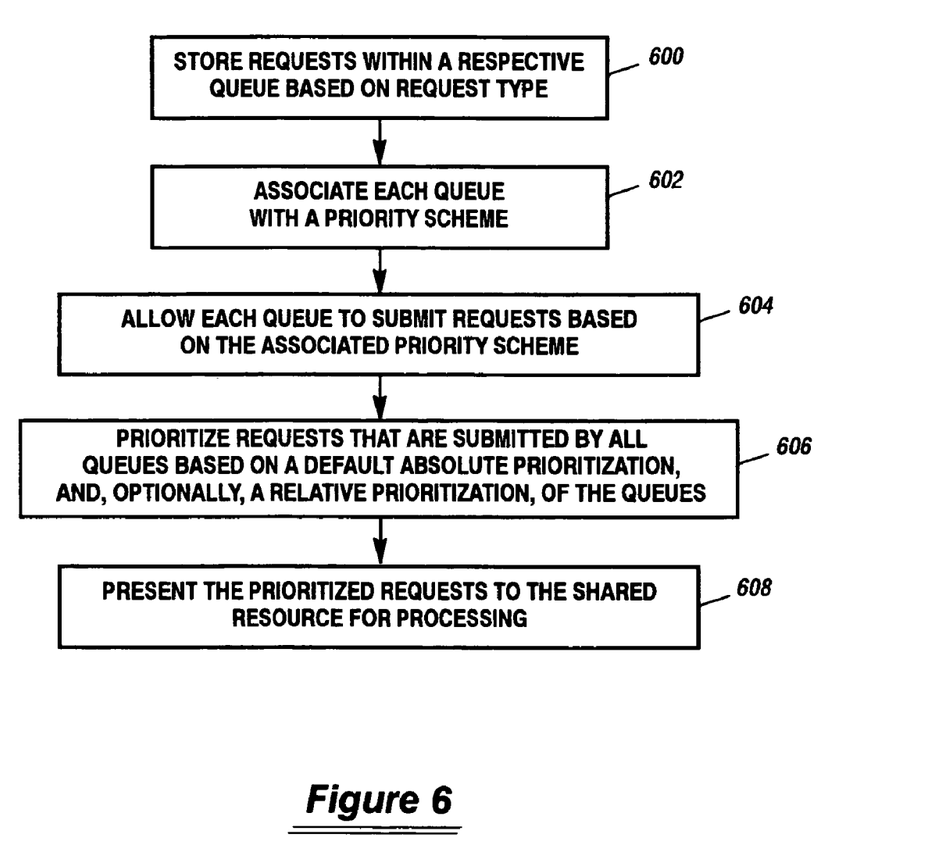
FIG. 6 is an exemplary method of using the current invention.

FIG. 6 is an exemplary method of using the current invention. Requests received from a processor are each stored in a respective one of various queues based on request type (600). Each of the queues is associated with a selected one of multiple priority schemes (602). In one embodiment, the priority schemes include rotational, burst, and preemptive priority modes. Other priority schemes may be used in addition to, or instead of, these priority modes. Each queue is allowed to submit requests based on the priority scheme associated with that queue (604). Requests submitted by the various queues are prioritized according to a default absolute prioritization of the queues, and, optionally, any relative prioritization of the queues (606). The prioritized requests are presented to the shared resource for processing (608). In the current example, the shared resource is a cache memory.

It will be appreciated that many alternative embodiments of the foregoing system and method are possible within the scope of the current invention. For example, the above priority mechanism is described as receiving various types of requests from requesters that are each respective queues. These requests are processed for presentation to a second-level cache. However, this invention may be employed to receive and process requests from any other requesters that are sharing a resource. For instance, the invention may be used to manage and process requests received directly from multiple processors that are sharing a resource such as a main memory, a cache, an input/output processor, some type of interface, an audio or video device, or any other resource. If desired, the requesters could themselves be memories, such as caches that are issuing requests to another shared cache or to a main memory.

According to another aspect of the invention, each of the programmable registers illustrated in FIG. 3 or 4 may be replaced with any other suitable programmable device. Additionally, one or more of these devices may be replaced with mechanical switches, or hardwired connections. For instance, default priority register 322 could be replaced with logic that operates according to a fixed priority rotation. In that event, modification to this hardwired default rotation could be accomplished using the rotate mask registers. If desired, one or more of these rotate mask registers could be eliminated, or replaced with hardwired connections. This would make the design less logic intensive but would also reduce design flexibility.

In another embodiment, one or more of the queues could be associated with a hardwired priority mechanism. For example, queue A could be hardwired to operate in preemptive mode. In this case, the request available signal on line 302 is provided directly to rotational logic as the request A signal on line 316, and priority logic section A is eliminated. Similarly, other priority logic sections may be hardwired to cause one or more queues to operate in burst mode. In either case, the logic is simplified, but the design becomes less flexible. Thus, the embodiments presented herein are to be considered exemplary only, and the scope of the invention is indicated only by the claims that follow rather than by the foregoing description.

What is claimed is:

1. A data processing system comprising:
   a processor;
   a shared resource;
   multiple requesters that are each coupled to issue requests to the shared resource;
   multiple priority logic sections, each coupled to one of the multiple requesters and adapted to implement multiple priority schemes, the priority logic section is configured to allow each requester to be associated with any selected one of the multiple priority schemes irrespective of which of the priority schemes is associated with any of the other requesters, the priority logic section to prioritize the requests from each requester for presentation to the shared resource based on the priority scheme associated with the requester;
   rotational logic included within each priority logic section adapted to prioritize requests from the requesters according to a predetermined default prioritization order assigned to the requesters;
   a snapshot register included within each priority logic section and coupled to the requesters to store, at periodic intervals, a snapshot identifying which of the requesters have requests pending at the time the snapshot is stored; and
   wherein the priority scheme associated with a respective one of the requesters is a rotational mode priority scheme.

2. The data processing system of claim 1, wherein the shared resource is a memory and wherein each of the requesters is a queue storing a respectively different type of the requests.

3. The data processing system of claim 1, wherein the priority logic section includes a programmable storage device to store data indicating the predetermined default prioritization order.

4. A method of employing priority schemes within a data processing system including a processor and a shared resource, said method comprising:
   receiving requests for the shared resource from multiple requesters;
   responsively implementing multiple priority schemes so as to allow each requester to be associated with any selected one of the multiple priority schemes irrespective of which of the priority schemes is associated with any of the other requesters;
   prioritizing the requests from each requester for presentation to the shared resource based on a priority scheme associated with the requester;
   taking and storing snapshots at periodic intervals so as to identify which of the requesters have requests pending at the time a given snapshot was taken; and
   processing the pending requests in accordance with a predetermined default order; and
   associating one of the requesters with a burst priority scheme.

5. A method of employing priority schemes within a data processing system including a processor and a shared resource, said method comprising:
   receiving requests for the shared resource from multiple requesters;
   responsively implementing multiple priority schemes so as to allow each requester to be associated with any selected one of the multiple priority schemes irrespective of which of the priority schemes is associated with any of the other requesters;
   prioritizing the requests from each requester for presentation to the shared resource based on a priority scheme associated with the requester;
   taking and storing snapshots at periodic intervals so as to identify which of the requesters have requests pending at the time a given snapshot was taken;
   processing the pending requests in accordance with a predetermined default order; and
   associating one of the requesters with a rotational priority scheme.

6. A method of employing priority schemes within a data processing system including a processor and a shared resource, said method comprising:
   receiving requests for the shared resource from multiple requesters;

responsively implementing multiple priority schemes so as to allow each requester to be associated with any selected one of the multiple priority schemes irrespective of which of the priority schemes is associated with any of the other requesters;

prioritizing the requests from each requester for presentation to the shared resource based on a priority scheme associated with the requester;

taking and storing snapshots at periodic intervals so as to identify which of the requesters have requests pending at the time a given snapshot was taken;

processing the pending requests in accordance with a predetermined default order; and associating one of the requesters with a preemptive priority scheme.

7. The method of claim 4, wherein at least one of the predetermined default order is programmable.

8. The method of claim 5, wherein at least one of the predetermined default order is programmable.

9. The method of claim 6, wherein at least one of the predetermined default order is programmable.

10. A data processing system comprising:

a processor;

a shared resource;

multiple requesters that are each coupled to issue requests to the shared resource;

multiple priority logic sections, each coupled to one of the multiple requesters and adapted to implement multiple priority schemes, the priority logic section is configured to allow each requester to be associated with any selected one of the multiple priority schemes irrespective of which of the priority schemes is associated with any of the other requesters, the priority logic section to prioritize the requests from each requester for presentation to the shared resource based on the priority scheme associated with the requester;

rotational logic included within each priority logic section adapted to prioritize requests from the requesters according to a predetermined default prioritization order assigned to the requesters;

a snapshot register included within each priority logic section and coupled to the requesters to store, at periodic intervals, a snapshot identifying which of the requesters have requests pending at the time the snapshot is stored; and wherein the priority scheme associated with a respective one of the requesters is a burst priority mode priority scheme.

11. The data processing system of claim 10, wherein the shared resource is a memory and wherein each of the requesters is a queue storing a respectively different type of the requests.

12. The data processing system of claim 10, wherein the priority logic section includes a programmable storage device to store data indicating the predetermined default prioritization order.

13. A data processing system comprising:

a processor;

a shared resource;

multiple requesters that are each coupled to issue requests to the shared resource;

multiple priority logic sections, each coupled to one of the multiple requesters and adapted to implement multiple priority schemes, the priority logic section is configured to allow each requester to be associated with any selected one of the multiple priority schemes irrespective of which of the priority schemes is associated with any of the other requesters, the priority logic section to prioritize the requests from each requester for presentation to the shared resource based on the priority scheme associated with the requester;

rotational logic included within each priority logic section adapted to prioritize requests from the requesters according to a predetermined default prioritization order assigned to the requesters;

a snapshot register included within each priority logic section and coupled to the requesters to store, at periodic intervals, a snapshot identifying which of the requesters have requests pending at the time the snapshot is stored; and wherein the priority scheme associated with a respective one of the requesters is a preemptive mode priority scheme.

14. The data processing system of claim 13, wherein the shared resource is a memory and wherein each of the requesters is a queue storing a respectively different type of the requests.

15. The data processing system of claim 13, wherein the priority logic section includes a programmable storage device to store data indicating the predetermined default prioritization order.

* * * * *